(12) United States Patent
Eskridge et al.

(10) Patent No.: US 6,935,175 B2
(45) Date of Patent: Aug. 30, 2005

(54) CAPACITIVE PICK-OFF AND ELECTROSTATIC REBALANCE ACCELEROMETER HAVING EQUALIZED GAS DAMPING

(75) Inventors: Mark H. Eskridge, Renton, WA (US); David L. Malametz, Lynnwood, WA (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/718,974

(22) Filed: Nov. 20, 2003

(65) Prior Publication Data

US 2005/0109109 A1 May 26, 2005

(51) Int. Cl.[7] .................. G01P 15/125; G01P 15/00
(52) U.S. Cl. .................. 73/514.32; 73/514.21
(58) Field of Search .................. 73/514.21–514.24, 73/514.32, 514.07, 514.12, 514.16, 514.18, 73/514.29, 514.36, 514.37

(56) References Cited

U.S. PATENT DOCUMENTS

| | | |
|---|---|---|
| 4,945,765 A | 8/1990 | Roszhart |
| 5,006,487 A | 4/1991 | Stokes |
| 5,905,203 A * | 5/1999 | Flach et al. ............... 73/514.32 |
| 6,631,641 B1 * | 10/2003 | Schalk et al. ............ 73/504.03 |
| 2002/0189355 A1 | 12/2002 | Leonardson |
| 2004/0160232 A1 * | 8/2004 | Yue et al. ................... 324/660 |

* cited by examiner

Primary Examiner—Helen C. Kwok
(74) Attorney, Agent, or Firm—Charles J. Rupnick, Attorney at Law

(57) ABSTRACT

A Micro Electro-Mechanical System (MEMS) acceleration sensing device, formed of a an elongated sensing element of substantially uniform thickness suspended for motion relative to a rotational axis offset between first and second ends thereof such that a first portion of the sensing element between the rotational axis and the first end is longer than a shorter second portion between the rotational axis and the second end; a stationary silicon substrate spaced away from the sensing element; a capacitor formed by a surface of the substrate and each of the first and second portions of the sensing element; and a valley formed in the substrate surface opposite from the first longer portion of the sensing element and spaced away from the rotational axis a distance substantially the same as the distance between the rotational axis and the second end of the sensing element.

20 Claims, 5 Drawing Sheets

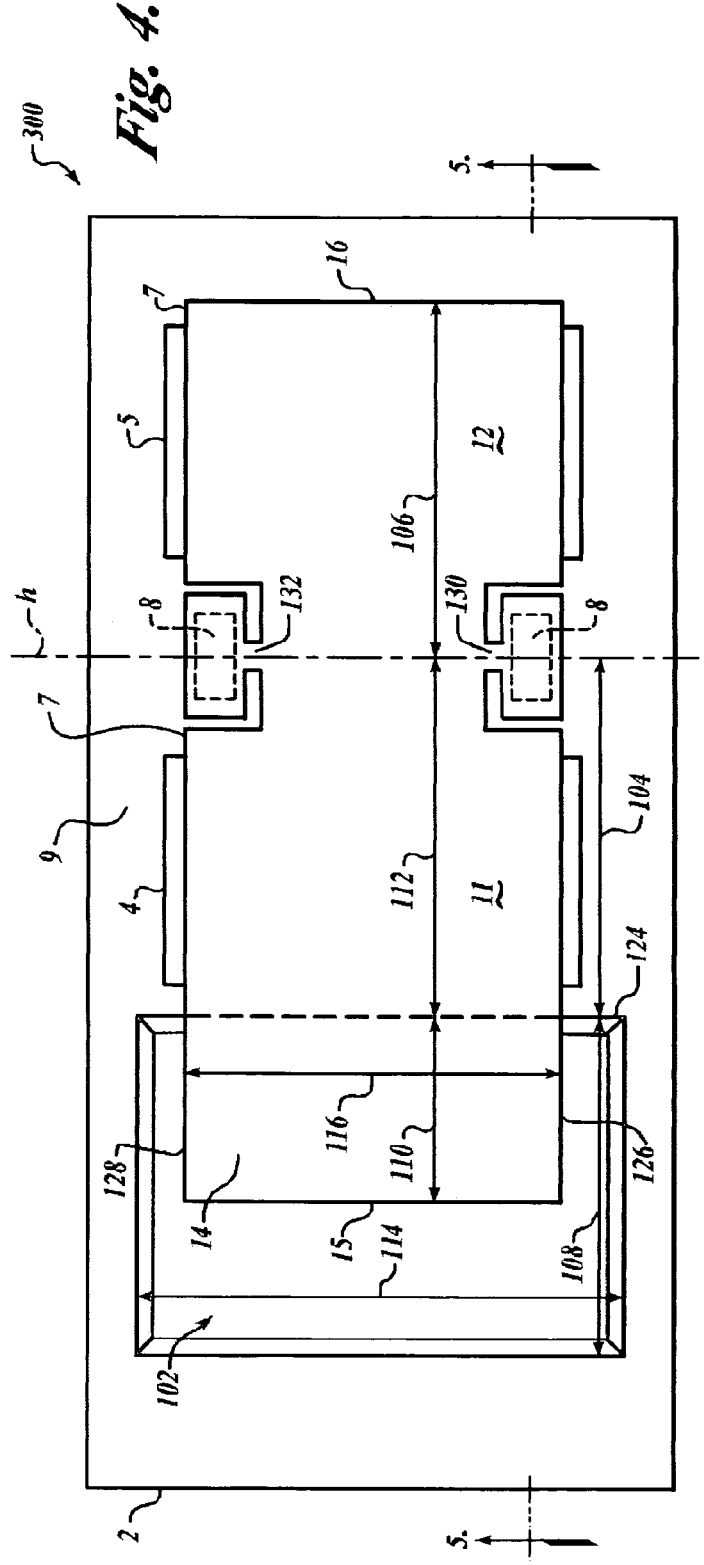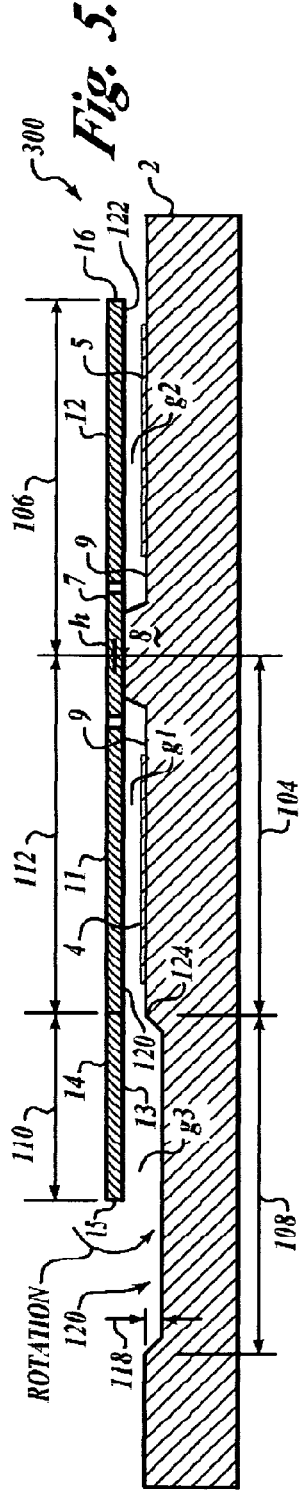

CAPACITIVE PICK-OFF AND ELECTROSTATIC REBALANCE ACCELEROMETER HAVING EQUALIZED GAS DAMPING

FIELD OF THE INVENTION

The present invention relates to Micro Electro-Mechanical System (MEMS) sensor devices and methods, and in particular to accelerometer sensor devices and methods based on capacitive pick-off and electrostatic rebalance.

BACKGROUND OF THE INVENTION

Sensor devices, including accelerometers, based on capacitive pick-off and electrostatic closed-loop rebalance are generally well known.

FIG. 1 illustrates, in accordance with prior art, a capacitive pick-off sensor constructed as a conventional mid-pendulum hinged or "teeter-totter" type accelerometer. Such devices are constructed using microcircuit techniques to produce reliable, maintenance-free capacitive acceleration-sensing devices. Such a capacitive acceleration sensing device 1, hereinafter a capacitive accelerometer, includes a pair of stationary substrates 2, 3 having opposed parallel planar faces. The substrates 2, 3 are spaced from one another and each has a number of metal electrode layers 4, 5 of predetermined configuration deposited on one surface to form respective capacitor electrodes or "plates." The electrode elements 4 (or 5) operates as an excitation electrode to receive stimulating signals, and the other electrode elements 5 (or 4) operate as the feedback electrodes for electrostatic rebalance. A single set of electrode elements 4 (or 5) operates as both excitation and feedback electrodes when the feedback signal is superimposed on the excitation signal.

A pendulous acceleration sensing element 7, commonly referred to as either a "pendulum" or a "proof mass," which operates as pick-off electrode, is flexibly suspended between the substrates 2, 3 at elevated attachment points 8 for pendulous rotation about a hinge axis h to form different sets of capacitors with electrode elements 4, 5. Movement of the acceleration-sensing element, or "pendulum," 7 in response to acceleration changes its position relative to the stationary excitation electrodes 4 (or 5), thereby causing a change in pick-off capacitance. This change in pick-off capacitance is indicative of acceleration. A set of capacitors for electrostatic rebalance is made up of the sensing element 7 and the feedback electrodes 5 (or 4) for driving the sensing element 7 to its reference position balanced between the electrode elements 4, 5 and maintaining it there.

In such an acceleration sensor device, a capacitance formed by the excitation electrodes 4 (or 5) and the moveable sensing element 7 is related to 1/D, where D is the offset between electrodes 4, 5 and the hinge axis h of the pendulous acceleration sensing element 7 when constructed or emplaced relative to the substrates 2, 3 on the elevated attachment points 8.

A desirable characteristic of an accelerometer is a linear response for pick-off capacitance C versus acceleration input g. However, conventional high-g range teeter-totter type accelerometers have less than optimum linearity for high performance application and may also have a non-monotonic response for electrostatic rebalance force versus acceleration when feedback voltage is capped. The capacitance seen by the pick-off electrodes is related to the integral of $1/d(i)$ for each $a(i)$ over the area of the excitation electrodes, where $d(i)$ is the dynamic separation distance between the stationary electrodes and the pendulum for each incremental area $a(i)$. The sensor's dynamic range, scale factor and response linearity are thus defined by the separation distance D (shown in FIG. 1) between the stationary electrode elements 4, 5 and the hinge axis h of the pendulous acceleration-sensing element 7, and the lateral offset of electrode elements 4, 5 relative to the attachment points 8. In a conventional teeter-totter type acceleration sensor device, the stationary capacitor electrodes 4, 5 are traditionally arranged substantially along a longitudinal axis of symmetry L of the acceleration sensing device 1 perpendicular to the hinge axis h of the acceleration-sensing element 7, as illustrated in FIG. 1. Electrode elements 4, 5 are sized and spaced symmetrically with respect to the longitudinal axis L of the acceleration sensing device 1, while the electrode elements 4 (or 5) operating as excitation electrodes are further sized and spaced symmetrically with respect to the attachment points 8 and the hinge axis h of the moveable sensing element 7.

Conventional teeter-totter type acceleration sensor devices of the type illustrated in FIG. 1 have been fabricated from a body of semiconductor material, such as silicon, as Micro Electro-Mechanical Systems, or "MEMS," integrated micro devices or systems combining electrical and mechanical components fabricated using integrated circuit (IC) batch processing techniques.

In the most general form, MEMS consist of mechanical microstructures, microsensors, microactuators and electronics integrated in the same environment, i.e., on a silicon chip. MEMS is an enabling technology in the field of solid-state transducers, i.e., sensors and actuators. The MEMS microfabrication technology enables fabrication of large arrays of devices, which individually perform simple tasks but in combination can accomplish complicated functions. Current applications include accelerometers, pressure, chemical and flow sensors, micro-optics, optical scanners, and fluid pumps. For example, one micromachining technique involves masking a body of silicon in a desired pattern, and then deep etching the silicon to remove unmasked portions thereof. The resulting three-dimensional silicon structure functions as a miniature mechanical force sensing device, such as an accelerometer that includes a proof mass suspended by a flexure. Existing techniques for manufacturing these miniature devices are described in U.S. Pat. No. 5,006,487, "METHOD OF MAKING AN ELECTROSTATIC SILICON ACCELEROMETER"; U.S. Pat. No. 4,945,765 "SILICON MICROMACHINED ACCELEROMETER"; and co-pending U.S. patent application Ser. No. 10/368,160, "MEMS ENHANCED CAPACITIVE PICK-OFF AND ELECTROSTATIC REBALANCE ELECTRODE PLACEMENT" filed in the names of Aiwu Yue and Ronald B. Leonardson on Feb. 18, 2003, the complete disclosures of all of which are incorporated herein by reference.

High aspect ratio MEMS or "HIMEMS" is one known process for producing such MEMS devices, including MEMS accelerometer devices. HIMEMS permits fabrication of intricate device designs in two dimensions, but requires a fixed device thickness, on the order of a cookie cutter.

Acceleration sensors fabricated using MEMS or HIMEMS technology generally include a moveable sensing element of the type illustrated in FIG. 1 and indicated by the reference character 7. The moveable sensing element is attached through attachment points of the type illustrated in FIG. 1 and indicated by the reference character 8 to a lower plate of the type illustrated in FIG. 1 and indicated by the reference character 3, where the lower plate is a substrate on which moveable sensing element is manufactured. The lower plate or substrate on which moveable sensing element is manufactured has formed thereon one set of the metal electrode layers of the type illustrated in FIG. 1 and indicated by the reference characters 4, 5.

According to the current state of the art for fabricating conventional teeter-totter type acceleration sensor devices of the type illustrated in FIG. 1 using MEMS or HIMEMS technology, the substrates 2, 3 are etched to form a "reverse mesa" or "valley" beneath the acceleration sensing element 7 except at the attachment points 8, whereby each of the attachment points 8 is formed as a "mesa" that is elevated relative to the bulk of the substrates 2, 3. The single etch step or operation thus constructs the attachment points 8 and releases the silicon acceleration sensing element 7 from the bulk of the substrate 2 (or 3) for operation.

During the single etch step, the remainder of the substrates 2, 3 is simultaneously formed with a substantially planar surface 9, 10, respectively, spaced by the distance D away from the acceleration sensing element 7 when emplaced. The etching of the substrates 2, 3 thus leaves attachment points 8 spaced above the substantially planar substrate surfaces 9, 10. Thus, when emplaced on the elevated attachment points 8, the acceleration sensing element 7 is spaced a short distance away from the substrate surfaces 9, 10 so that narrow gaps g1, g2 (best illustrated in FIG. 3), usually on the order of a few microns, for example on the order of 2–4 microns, wherein the acceleration sensing element 7 is free to move during operation are formed between the substrate surface 9 (or 10) and surfaces of the acceleration sensing element 7 on either side of the elevated attachment points 8.

When intended for operation as a teeter-totter type accelerometer of the type illustrated in FIG. 1, a first portion 11 of the moveable sensing element 7 on one side of the hinge axis h is formed with relatively greater mass than a second portion 12 on the other side of the hinge axis h to develop a desired amount of pendulosity. The greater mass of the first portion 11 may be developed by offsetting the hinge axis h relative to the longitudinal dimension of the sensing element 7, as illustrated in FIG. 1. In a device 1 fabricated using MEMS or HIMEMS technology, the sensing element 7 is necessarily a substantially two-dimensional object of substantially uniform thickness so that offsetting the hinge axis h causes the longer first portion 11 to have relatively greater mass than the shorter second portion 12 with a center of mass spaced relatively further from the hinge axis h.

Offset of the hinge axis h to shift the mass and develop the desired pendulosity in the sensing element 7 is problematic in a device fabricated using MEMS or HIMEMS technology. The sensing element 7 is necessarily a substantially two-dimensional object of substantially uniform thickness. Therefore, a surface area 13 of an extended portion 14 near the distal edge or tip 15 of the first sensing element portion 11 that is extended further from the hinge axis h than the distal edge or tip 16 of the shorter sensing element portion 12 necessarily causes the overall surface area of the larger and more massive first portion 11 to be larger than the corresponding overall surface area of the smaller and less massive second portion 12. This difference in surface area between the first and second portions 11, 12 degrades performance when the accelerometer device is operated in a vibration environment.

Air or another gas trapped in the narrow gaps g1, g2 between the first and second portions 11, 12 of the sensing element 7 and the planar surfaces 9, 10 of the substrates 2, 3 provide gas damping of the sensing element 7 when the sensing device 1 is operated in a vibration environment. Because the gas damping gaps g1, g2 are very small the gas damping effects between the sensing element portions 11, 12 and the planar substrate surfaces 9, 10 is very sensitive to differences in the surface areas of the larger first and smaller second portions 11, 12 of the sensing element 7, and according to well-known laws of mechanics and fluid dynamics the gas damping effects are especially sensitive to the distances at which the disproportionate areas of the larger first and smaller second sensing element portions 11, 12 are offset relative to the hinge axis h. In other words, the gas damping effects are particularly sensitive to the amount by which the overall surface area of the first sensing element portion 11 is increased by the surface area 13 of the extended portion 14 near its distal edge or tip 15 relative to the overall surface area of the relatively shorter sensing element portion 12.

Performance degradation is realized as a vibration rectification error (VRE) that is the result of unbalanced gas damping in the gaps g1, g2 between the first and second sensing element portions 11, 12 and the planar substrate surfaces 9, 10. This problem is exacerbated in teeter-totter type accelerometers fabricated using MEMS or HIMEMS technology because the gas damping gaps g1, g2 are very small, usually only a few microns, and teeter-totter type designs are usually over-damped because of the large surface area relative to the very narrow gap.

It is known to balance the gas damping by perforating at least part of the longer first portion 11 of the sensing element 7 with a large number of small holes 17 through which the gas may be transferred. For example, the holes 17 are formed through the first and second sensing element portions 11, 12 (omitted for clarity) and the extended portion 14 (shown). These holes 17 also aid in transfer of chemicals during fabrication. While these small gas transfer holes 17 help alleviate the unbalanced gas damping and resultant VRE, the holes 17 also the reduce mass of the sensing element 7. The reduced mass in turn reduces the pendulosity of the sensing element 7, which is also important to performance.

As is well-known in the art, the operating range of an accelerometer of the type illustrated in FIG. 1 is physically limited to the acceleration that overcomes the ability of the device to electrostatically balance the sensing element 7 relative to the electrode layers 4, 5 and causes the end or tip 15 and the corresponding extended portion 14 of the more massive first portion 11 of the teeter-totter type sensing element 7 to touch down on the surface 9 (or 10) of the substrate 2 (or 3). When this happens, the device 1 stops working until the sensing element 7 comes off the substrate surface 9 (or 10).

Another limitation of teeter-totter type accelerometer devices fabricated using MEMS or HIMEMS technology is caused by the substantially uniform thickness and planar surfaces of components that is required by the MEMS and HIMEMS technologies. The extremely narrow gas damping gaps g1, g2 permit a substantial portion of the smooth, uniform and planar surfaces of the sensing element 7 to physically contact the smooth, uniform and planar surfaces 9, 10 of one of the first and second substrates 2, 3 when the accelerometer experiences an acceleration in excess of its operating range. Such substantial physical contact causes the damping gases to be expelled from the gap g. it is known in the art that spring and electrostatic rebalance forces of the accelerometer are not always sufficient to overcome the resultant static and vacuum effects of the high pressure contact between the smooth surfaces whereupon the sensing element 7 becomes irretrievably "stuck" to one of the substrate 2 (or 3), never to release from the substrate surface 9 (or 10).

SUMMARY OF THE INVENTION

A teeter-totter type capacitive acceleration sensor device fabricated according to Micro Electro-Mechanical System (MEMS) or High aspect ratio MEMS (HIMEMS) that overcomes limitations of the prior art by providing a gap formed between a distal extended portion of the longer and more massive portion of the pendulous sensing element and an opposing portion of a corresponding substrate surface above which the pendulous sensing element is suspended.

According to one aspect of the invention, the sensor device is formed of a silicon substrate having a substantially planar surface with a pendulous acceleration-sensing element of substantially constant cross-section suspended by one or more integrally formed flexures and respective attachment points formed as mesas elevated above the substrate surface in close proximity to the substrate surface for motion relative to a rotational axis that is offset between a relatively longer and more massive portion and a relatively shorter and less massive portion of the pendulous sensing element with the longer and shorter portions of the pendulous sensing element forming different capacitors with respective first and second corresponding opposed portions of the substrate surface, the longer portion of the pendulous sensing element including a distal extended portion that is spaced away from the rotational axis at a distance that is substantially the same as the a length of the shorter portion measured between the rotational axis and a distal end thereof wherein first and second gas damping gaps are formed between respective the longer and shorter portions of the pendulous sensing element and the respective first and second corresponding opposing portions of the substrate surface, and a third gap is formed between the distal extended portion of the longer portion of the pendulous sensing element and an opposing third portion of the substrate surface corresponding thereto.

According to another aspect of the invention, the first and second gas damping gaps are sized to space the longer and shorter portions of the pendulous sensing element from respective first and second corresponding opposing portions of the substrate surface for forming the different capacitors therebetween, and the third gap is partially formed of a valley formed in the third portion of the substrate surface corresponding to the distal extended portion of the longer portion of the pendulous sensing element and is deeper than the first and second gas damping gaps. For example, the first and second gas damping gaps are on the order of a few microns while the third gap under the distal extended portion of the longer sensing element portion varies as a function of processing and design requirements, but may be on the order of as much or more than twice the size of the first and second gas damping gaps and is at least significantly larger than them.

According to another aspect of the invention, the valley formed in the third portion of the substrate surface whereof the third gap is formed is either further extended away from the rotational axis beyond an end of the distal extended portion of the longer portion of the pendulous sensing element, or is further extended to either side of the distal extended portion of the longer portion of the pendulous sensing element.

According to another aspect of the invention, the valley formed in the third portion of the substrate surface whereof the third gap is formed is both further extended both away from the rotational axis beyond an end of the distal extended portion of the longer portion of the pendulous sensing element and to both sides of the distal extended portion.

According to still other aspects of the invention, the present invention provides methods for forming a capacitive pick-off acceleration-sensing devices that overcome limitations of the prior art by having balanced gas damping wherein improved performance is realized in a reduced vibration rectification error (VRE).

According to one aspect of the invention, the method includes operating a first etching process on a silicon substrate for: i) releasing from a bulk portion of the substrate an elongated teeter-totter type sensing element having substantially planar and parallel surfaces spaced apart by a substantially uniform thickness of the substrate, and a first relatively longer and more massive sensing portion and a second relatively shorter and less massive sensing portion separated by one or more flexures positioned therebetween and arranged substantially crosswise to a longitudinal axis of the sensing element, the first relatively longer and more massive sensing portion having a first sensing portion extended adjacent to the one or more flexures and a length substantially the same as a length of the second relatively shorter and less massive sensing portion and a second mass portion at distal end thereof extended at a length that is greater than the length of the second relatively shorter and less massive sensing portion; ii) forming one or more mesas integral with the sensing element and supporting the one or more flexures at attachment points integral with the bulk portion of the substrate; and iii) forming first and second relatively narrow gas damping gaps between the bulk portion of the substrate and each of the first and second sensing portions of the teeter-totter type sensing element by forming first and second substantially planar surfaces on the bulk portion of the substrate spaced away a short distance from the respective first and second sensing portions of the sensing element. Additionally, the method of the present invention includes operating a second etching process on a silicon substrate for forming a gap relatively wider than the first and second relatively narrow gas damping gaps and positioned between the bulk portion of the substrate and the second mass portion at the distal end of the first relatively longer and more massive sensing portion of the sensing element.

According to another aspect of the method of the invention, the first and second etching processes of the method are optionally operated in alternate order with the second etching process being operated either before or after the first second etch process.

According to another aspect of the method of the invention, the first and second etching processes are operated according to either conventional Micro Electro-Mechanical System (MEMS) techniques or according to conventional High aspect ratio Micro Electro-Mechanical System (HIMEMS) techniques.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 4 and 5 illustrate the present invention embodied as a single-sided teeter-totter type capacitive acceleration-sensing device having a mid-pendulum hinge and balanced gas damping for improved performance through reduced vibration rectification error (VRE), wherein FIG. 5 is a top view of the device and FIG. 4 is a side section view taken relative to FIG. 5.

DETAILED DESCRIPTION OF PREFERRED EMBODIMENT

In the Figures, like numerals indicate like elements.

Figure 1:
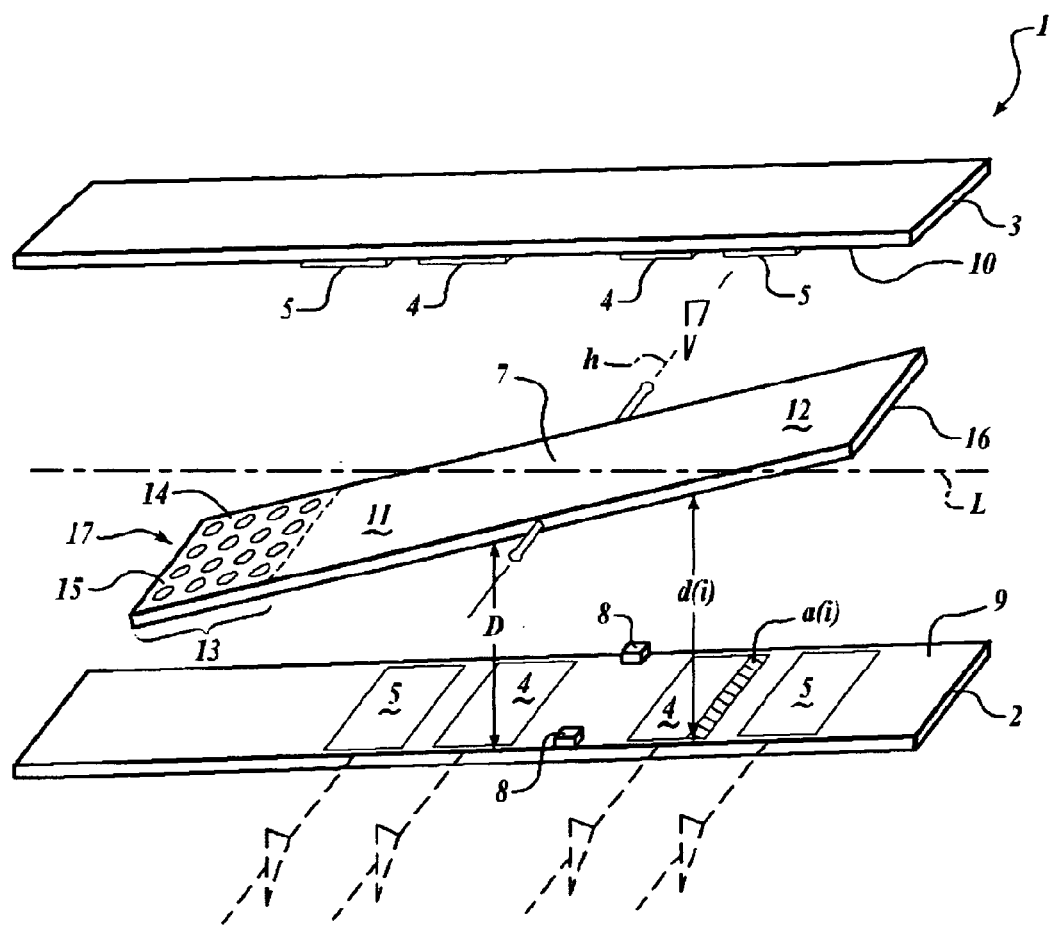
FIG. 1 is an exploded pictorial side view of a capacitive acceleration sensing device of the prior art that illustrates a typical mid-pendulum hinged or "teeter-totter" type accelerometer.
Figure 2:
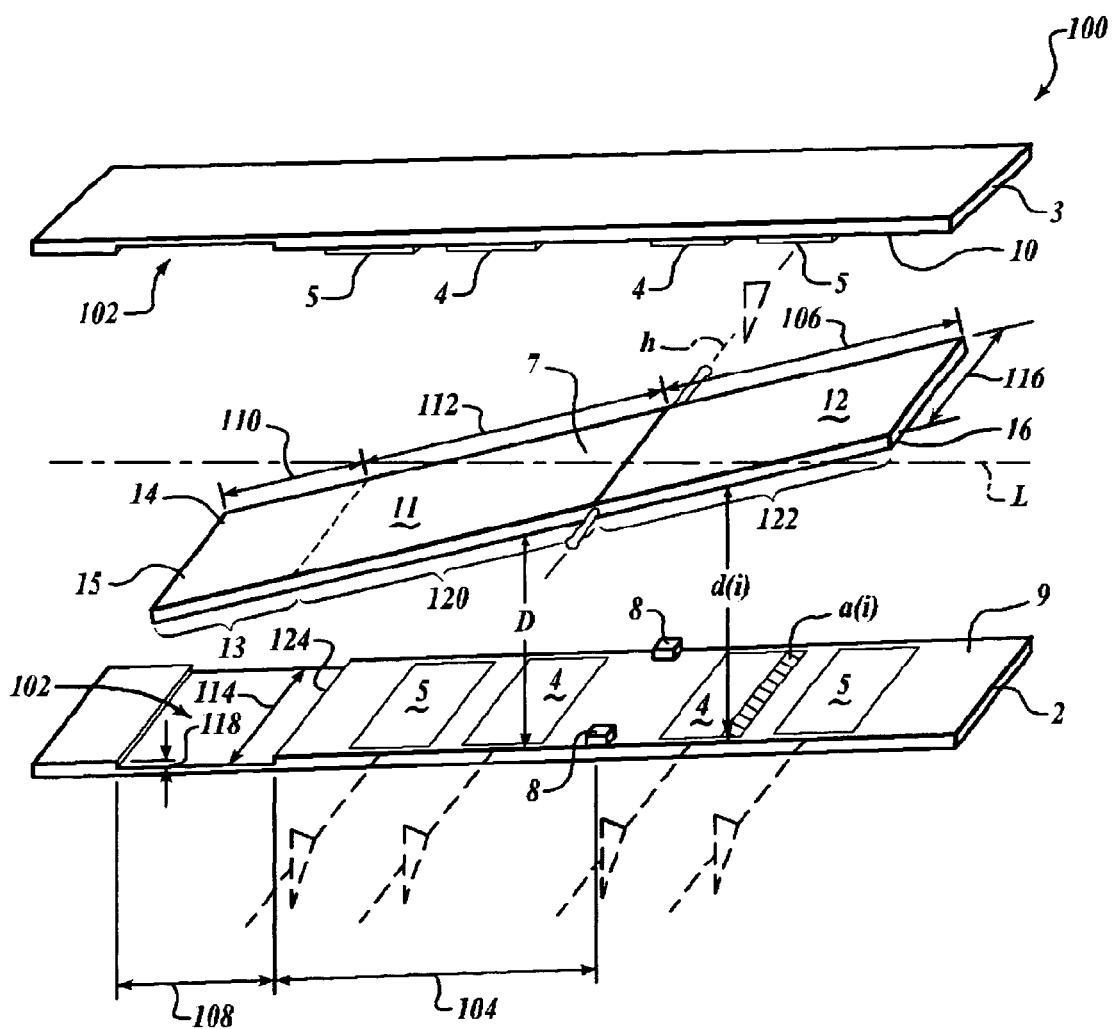
FIG. 2 is an exploded pictorial side view that illustrates the MEMS capacitive acceleration sensing device of the invention embodied as a pendulous acceleration sensing element having the second deeper "reverse mesa" or "valley" of the invention formed opposite an extended portion of the longer and more massive portion of the acceleration-sensing element.

FIG. 2 illustrates the present invention embodied as a capacitive acceleration-sensing device 100 of the mid-pendulum hinged or "teeter-totter" type fabricated using known Micro-Electro-Mechanical System (MEMS) or High aspect ratio MEMS (HIMEMS) technology and having balanced gas damping wherein improved performance is realized in a reduced vibration rectification error (VRE). Accordingly, the invention is embodied as an apparatus and method for providing, in a second etch operation performed after the known first etch operation that constructs the attachment points 8 and releases the silicon acceleration sensing element 7 from the bulk of the substrate 2 (or 3) for operation, a second deeper "reverse mesa" or "valley" 102 opposite the extended portion 14 adjacent to the tip 15 of the longer and more massive first portion 11 of the acceleration sensing element 7. The deeper reverse mesa 102 is provided beginning at a distance 104 from the attachment point 8 of the hinge axis h of the acceleration sensing element 7 that is substantially the same as an overall length 106 of the shorter second sensing element portion 12 as measured between the hinge axis h and its far edge 16 distal from the hinge axis h, and extending a distance 108 that is at least as great as a length 110 of the extended portion 14 of the longer and more massive first portion 11 of the acceleration sensing element 7 as measured beginning at a distance 112 from the hinge axis h that is substantially the same as the overall length 106 of the shorter second sensing element portion 12, and extending to the far edge 15 of the first portion 11 distal from the hinge axis h. The second deeper "reverse mesa" or "valley" 102 is fabricated having a width 114 that is substantially the same as or even greater than a corresponding width 116 of the acceleration sensing element 7 as measured substantially crosswise thereto, and a depth 118 extending into the substrate 2 (or 3) below the substrate surface 9 (or 10) as measured substantially perpendicularly to the corresponding substrate surface 9 (or 10) that is sufficient to substantially reduce or eliminate the gas damping effects normally associated with the surface area 13 of the extended portion 14 adjacent to the tip 15 of the longer and more massive first portion 11 of the acceleration sensing element 7.

A secondary gas damping gap g3 (best shown in FIG. 3) is thereby formed between the extended portion 14 and the corresponding substrate surface 9 (or 10) that renders the extended portion 14 substantially ineffective for damping the sensing element 7 without affecting either shifting or reducing its mass as was required in prior art devices, and the gas damping gap g1 formed between the substrate surface 9 (or 10) and an effective portion 120 of the longer and more massive first portion 11 of the teeter-totter type sensing element 7 is substantially the same size as the gas damping gap g2 formed between the substrate surface 9 (or 10) and the shorter and less massive second portion 12. The third gap g3 formed by the valley 102 under the distal extended portion of the longer sensing element portion 11 is significantly larger than the gas damping gaps g1, g2, but varies as a function of processing and design considerations. The third gap g3 may, for example, be on the order of as much or more than two or more times the size of the first and second gas damping gaps g1, g2 and is at least significantly larger. For example, when the first and second gas damping gaps g1, g2 are on the order of a few microns, the third gap g3 may be on the order of about 5 microns. However, this is by example only as there is no theoretical maximum depth of the valley 102 which may extend completely through the substrate. The two effective gas damping gaps g1, g2 are thus of substantially equivalent area and narrowness and are substantially equivalently positioned relative to the hinge axis h of the sensing element 7. The substantially equivalent gas damping gaps g1, g2 result in the mid-pendulum hinged or teeter-totter type capacitive acceleration-sensing device 100 of the invention having substantially balanced gas damping, whereby improved performance is realized in a reduced vibration rectification error (VRE).

Construction of the second deeper "reverse mesa" or "valley" 102 resulting in the secondary gas damping gap g3 between the extended portion 14 of the longer and more massive portion 11 of the acceleration sensing element 7 distal of the hinge axis h thus evens or equalizes the gas damping between the first and second portions 11, 12 and the corresponding substrate surfaces 9 (or 10), which as is well-known in the art and discussed herein is very sensitive to the distance at which the disproportionate areas of the larger first and smaller second sensing element portions 11, 12 are offset relative to the hinge axis h.

Furthermore, as is well-known in the art and discussed herein in detail, the gas damping effects are particularly sensitive to the amount of surface area 13 of the extended portion 14 of the first sensing element portion 11 that is near its tip 15 and consequently further from the hinge axis h than an effective surface area 122 of the shorter sensing element portion 12. Therefore, the second deeper reverse mesa or valley 102 also equalizes the positions of the two effective gas damping gaps g1, g2 relative to the hinge axis h of the acceleration sensing element 7.

Additionally, the second deeper reverse mesa or valley 102 effectively lowers the overall damping of the device 100 and eliminates the need in prior art devices to impair pendulosity by perforating the extended portion 14 at the end of the longer and more massive first portion 11. As a result, the extended portion 14 that is positioned opposite the reverse mesa or valley 102 is permitted to remain unperforated so that pendulosity is improved. However, the perforation holes 17 (omitted for clarity) are optionally provided throughout the first and second portions 11, 12 of the sensing element 7 at least for transfer of chemicals during fabrication and to help alleviate over-damping. Furthermore, the perforation holes 17 may be provided to greater or lesser extent in the extended portion 14 both for transfer of chemicals during fabrication and to help alleviate over-damping.

The second deeper reverse mesa or valley 102 also effectively limits "stick down" by limiting the potential contact area to the effective areas 120, 122 nearer the hinge point 8 and by providing an edge 124 rather than the continuous surface 9 (or 10) of the substrate 2 (or 3) for the acceleration sensing element 7 to contact when exposed to accelerations above the operating range.

Figure 3:
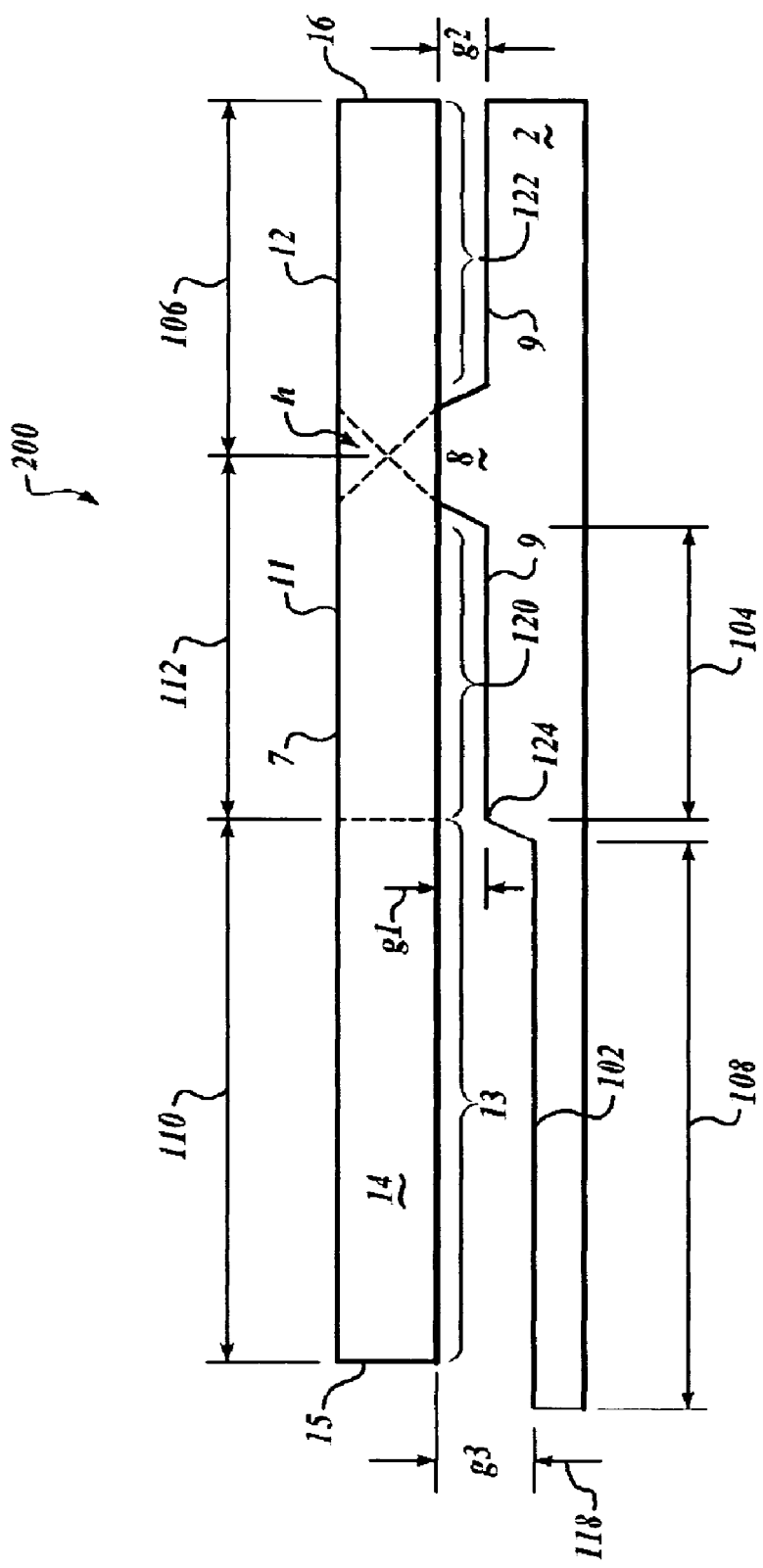
FIG. 3 is a simplified side view of a single-sided capacitive acceleration-sensing device of the mid-pendulum hinged or teeter-totter type including the second deeper "reverse mesa" or "valley" of the invention and illustrating the substantially equivalent gas damping gaps between the substrate surface and the effective gas damping surfaces corresponding to both the larger more massive portion of the sensing element and the smaller less massive portion.

FIG. 3 is a simplified side view of the present invention embodied as a single-sided capacitive acceleration-sensing device 200 of the mid-pendulum hinged or teeter-totter type similar to the double-sided device 100 illustrated in FIG. 2. FIG. 3 best illustrates the substantially equivalent gas damping gaps g1, g2 between the surface 9 of the substrate 2 and the effective gas damping surfaces 120, 122 corresponding to the larger more massive first and smaller less massive second portions 11, 12 of the sensing element 7. As illustrated in FIG. 3, the length 108 of the second deeper reverse mesa or valley 102 is optionally longer than the length 110 of the corresponding surface area 13 of the extended portion 14 of the longer first portion 11 of the sensing element 7, whereby the second deeper valley 102 extends beyond the end 15 of the extended portion 14. Over sizing the valley 102 relative to the corresponding surface area 13 reduces the accuracy with which the valley 102 must be positioned in order to be effective according to the invention.

FIGS. 4 and 5 illustrate the present invention embodied as a single-sided teeter-totter type open-loop capacitive acceleration-sensing device 300 having a mid-pendulum hinge that is fabricated using known Micro-Electro-Mechanical System (MEMS) or High aspect ratio MEMS (HIMEMS) technology wherein and gas damping is balanced so that improved performance is realized in a reduced vibration rectification error (VRE). FIG. 5 is a top view of the device 300 and FIG. 4 is a side section view taken relative to FIG. 5. The open-loop device 300 is equipped with single metal electrode layers or sense pads 4, 5 on opposite sides of the hinge axis h. As illustrated in FIG. 5, the electrode layers or sense pads 4, 5 are optionally oversized relative to the width 116 of the moveable sensing element 7 to avoid fringing effects and reduce the lateral accuracy with which the electrode layers or sense pads 4, 5 must be positioned in order to be effective.

The length 108 and width 114 of the second deeper reverse mesa or valley 102 are optionally both longer than the length 110 and wider than the width 116 of the corresponding surface area 13 of the extended portion 14 of the longer first portion 11 of the sensing element 7, whereby the second deeper valley 102 extends beyond the end 15 and to both sides 126, 128 of the extended portion 14. Over sizing the length 108 and width 114 of the valley 102 relative to the corresponding surface area 13 reduces the accuracy with which the valley 102 must be positioned in order to be effective according to the invention.

As discussed herein, the pendulous acceleration sensing element 7, which operates as pick-off electrode, is flexibly suspended a few microns above the substrate 2 at elevated attachment points 8 for pendulous rotation about the hinge axis h for forming different sets of capacitors with the electrode elements 4, 5. Movement of the acceleration-sensing element, or "pendulum," 7 in response to acceleration changes its position relative to the stationary excitation electrodes 4, 5, thereby causing a change in pick-off capacitance. This change in pick-off capacitance is indicative of acceleration. A set of capacitors for electrostatic rebalance is made up of the sensing element 7 and the feedback electrodes 4, 5 for driving the sensing element 7 to its reference position balanced between the electrode elements 4, 5 and maintaining it there. The sensing element 7 is suspended for pendulous motion by a pair of integral flexures 130, 132 coupled to the substrate 2 through the attachment points 8 and integral therewith.

Figure 6:
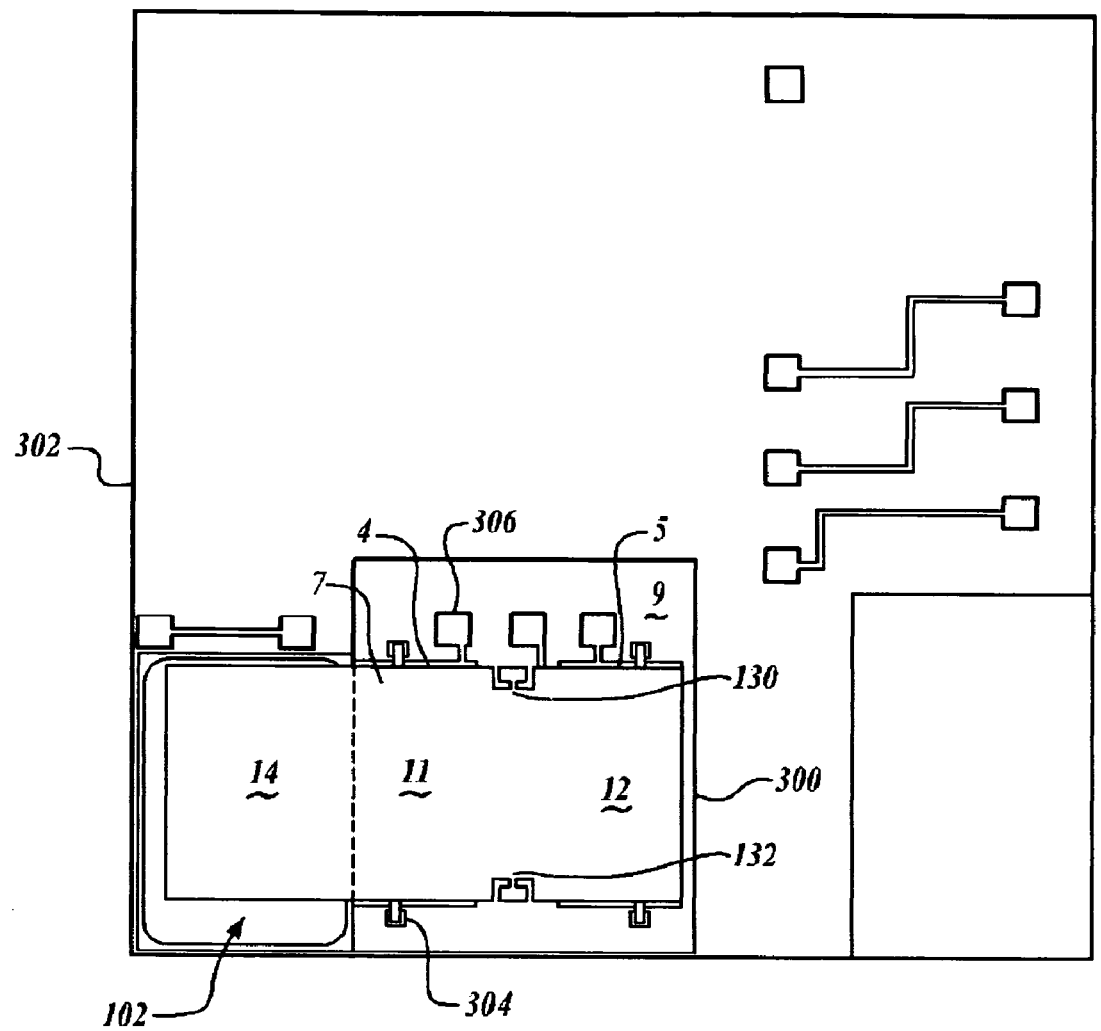
FIG. 6 illustrates the present invention embodied as the single-sided teeter-totter type capacitive acceleration-sensing device of FIGS. 4, 5 having a mid-pendulum hinge that is fabricated as an integrated circuit (IC) on a silicon die using known Micro-Electro-Mechanical System (MEMS) or High aspect ratio MEMS (HIMEMS) technology.

FIG. 6 illustrates the present invention embodied as the single-sided teeter-totter type capacitive acceleration-sensing device 300 of FIGS. 4, 5 having a mid-pendulum hinge that is fabricated as an integrated circuit (IC) on a silicon die 302 using known Micro-Electro-Mechanical System (MEMS) or High aspect ratio MEMS (HIMEMS) technology, whereby the components of the acceleration-sensing device 300: acceleration-sensing element 7; elevated attachment points 8; flexures 130, 132 by which the sensing element 7 is coupled to the substrate 2 (here silicon die 302); and corresponding substrate surface 9, are formed in a first conventional silicon etch processing step as is well-known in the art. Over-travel stops 304 are provided relative to the sensing element 7. The second deeper valley 102 is formed, as discussed herein, under the extended portion 14 of the longer and more massive first portion 11 of the sensing element 7 in a second etch processing step following the first etch processing step. The second etch processing step is a conventional silicon etching process performed according to well-known MEMS or HIMEMS techniques.

The electrodes or sense pads 4, 5 are oversized relative to the acceleration-sensing element 7 to avoid fringing effects and are electrically coupled through different electrical connections and traces to additional different wire bond pads 306 on the surface of the die 302. Well-known drive and sense circuitry is also installed on the die 302 so that the die 302 presents an operational a capacitive acceleration-sensing device having the having balanced gas damping of the invention wherein reduced VRE results in improved device performance.

While the preferred embodiment of the invention has been illustrated and described, it will be appreciated that various changes can be made therein without departing from the spirit and scope of the invention.

What is claimed is:

1. A Micro Electro-Mechanical System (MEMS) sensor device, comprising:
   an elongated sensing element of substantially uniform thickness suspended for motion relative to a rotational axis offset between first and second ends thereof such that a first portion of the sensing element between the rotational axis and the first end is longer than a shorter second portion between the rotational axis and the second end;
   a substrate spaced away from the sensing element;
   one or more capacitors formed by a surface of the substrate and each of the first and second portions of the sensing element; and a valley formed in the substrate surface opposite from the first longer portion of the sensing element and spaced away from the rotational axis a distance substantially the same as the distance between the rotational axis and the second end of the sensing element.

2. The sensor device of claim 1 wherein a floor of the valley is spaced away from the longer first portion of the sensing element a distance that is greater than a capacitor gap formed by a surface of the substrate and the longer first portion of the sensing element.

3. The sensor device of claim 1 wherein the valley covers an area of the substrate surface substantially commensurate with a portion at the end of the longer first portion of the sensing element that is extended beyond the length of the shorter second portion.

4. The sensor device of claim 1 wherein the valley extends beyond the end of the longer first portion of the sensing element.

5. The sensor device of claim 1 wherein the valley extends on each side of the longer first portion of the sensing element.

6. The sensor device of claim 1 wherein a floor of the valley is spaced away from the longer first portion of the sensing element a distance on the order of approximately two or more times greater than spacing between the substrate and each of the first and second portions of the sensing element.

7. A sensor device fabricated according to Micro Electro-Mechanical System (MEMS) or High aspect ratio MEMS (HIMEMS), the sensor device comprising:
a silicon substrate having a substantially planar surface;
a pendulous sensing element of substantially constant cross-section suspended in close proximity to the substrate surface for motion relative to a rotational axis that is offset between a longer and a shorter portion of the pendulous sensing element with the longer and shorter portions of the pendulous sensing element forming different capacitors with respective first and second corresponding opposing portions of the substrate surface, the longer portion of the pendulous sensing element including a distal extended portion that is spaced away from the rotational axis at a distance that is substantially the same as a length of the shorter portion measured between the rotational axis and a distal end thereof;
first and second gas damping gaps formed between respective the longer and shorter portions of the pendulous sensing element and the respective first and second corresponding opposing portions of the substrate surface; and
a third gap formed between the distal extended portion of the longer portion of the pendulous sensing element and an opposing third portion of the substrate surface corresponding thereto.

8. The sensor device of claim 7 wherein the first and second gas damping gaps are sized to space the longer and shorter portions of the pendulous sensing element from respective first and second corresponding opposing portions of the substrate surface for forming the different capacitors therebetween.

9. The sensor device of claim 8 wherein the third gap is deeper than the first and second gas damping gaps.

10. The sensor device of claim 9 wherein the third gap further comprises a valley formed in the third portion of the substrate surface corresponding to the distal extended portion of the longer portion of the pendulous sensing element.

11. The sensor device of claim 10 wherein the valley formed in the third portion of the substrate surface whereof the third gap is formed is further extended away from the rotational axis beyond an end of the distal extended portion of the longer portion of the pendulous sensing element.

12. The sensor device of claim 10 wherein the valley formed in the third portion of the substrate surface whereof the third gap is formed is further extended to either side of the distal extended portion of the longer portion of the pendulous sensing element.

13. The sensor device of claim 10 wherein the valley formed in the third portion of the substrate surface whereof the third gap is formed is further extended both away from the rotational axis beyond an end of the distal extended portion of the longer portion of the pendulous sensing element and to both sides of the distal extended portion.

14. The sensor device of claim 9 wherein the pendulous sensing element further comprises a pendulous acceleration-sensing element.

15. The sensor device of claim 7, further comprising one or more flexures suspending the pendulous sensing element relative to the substrate surface for motion relative to the rotational axis, the one or more flexures being formed integrally with the pendulous sensing element and respective attachment points formed as mesas elevated above the substrate first and second surfaces opposing the longer and shorter portions of the pendulous sensing element.

16. The sensor device of claim 7 wherein the third gap is at least significantly larger than the first and second gas damping gaps.

17. A capacitive pick-off acceleration-sensing device, the device comprising:
a silicon substrate an elongated teeter-totter type sensing element formed in a bulk portion of the substrate having substantially planar and parallel surfaces spaced apart by a substantially uniform thickness of the substrate, the sensing element further comprising:
a first relatively longer and more massive portion and a second relatively shorter and less massive portion separated by one or more flexures positioned therebetween and arranged substantially crosswise to a longitudinal axis of the sensing element, the first relatively longer and more massive portion having a first sensing portion extended adjacent to the one or more flexures and a length substantially the same as a length a sensing portion of the second relatively shorter and less massive portion and a second mass portion at distal end thereof extended at a length that is greater than the length of the second relatively shorter and less massive portion;
one or more mesas formed integral with the sensing element and supporting the one or more flexures at attachment points integral with the bulk portion of the substrate;
first and second relatively narrow gas damping gaps formed between the bulk portion of the substrate and each of the first and second portions of the teeter-totter type sensing element, the first and second relatively narrow gas damping gaps formed by first and second substantially planar surfaces of the bulk portion of the substrate that are spaced away a short distance from the respective first and second portions of the sensing element; and a second gap relatively wider than the first and second relatively narrow gas damping gaps and positioned between the bulk portion of the substrate and the second mass portion at the distal end of the first relatively longer and more massive portion of the sensing element.

18. The device of claim 17 wherein the sensing portion of the second relatively shorter and less massive portion of the sensing element is substantially the entire length of the second relatively shorter portion of the sensing element.

19. The device of claim 17 wherein the first and second substantially planar surfaces of the bulk portion of the substrate are spaced away from the respective first and second portions of the sensing element by substantially the same short distance.

20. The device of claim 17 wherein the he first and second relatively narrow gas damping gaps further comprise gas damping gaps of substantially the same width.

* * * * *